No. 764,412.

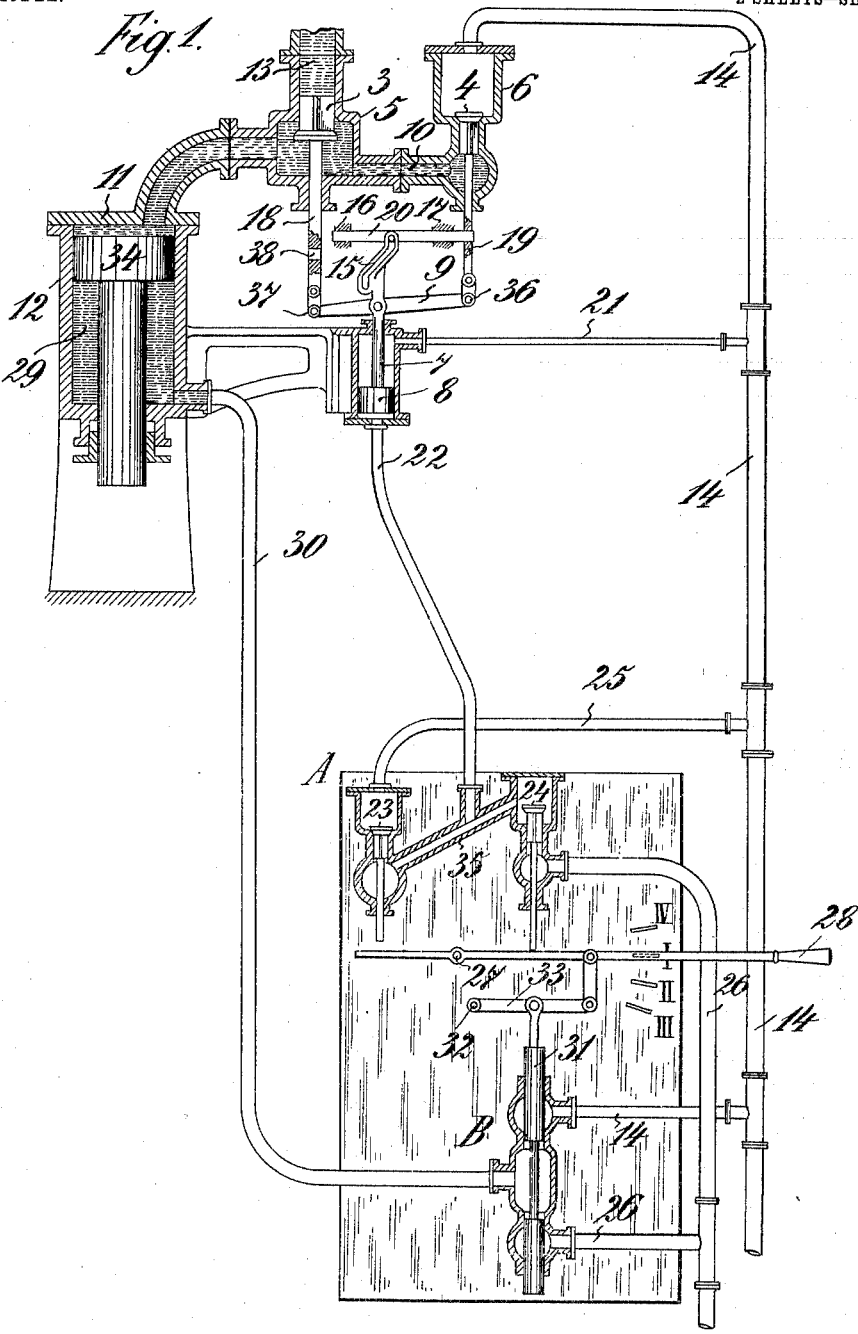

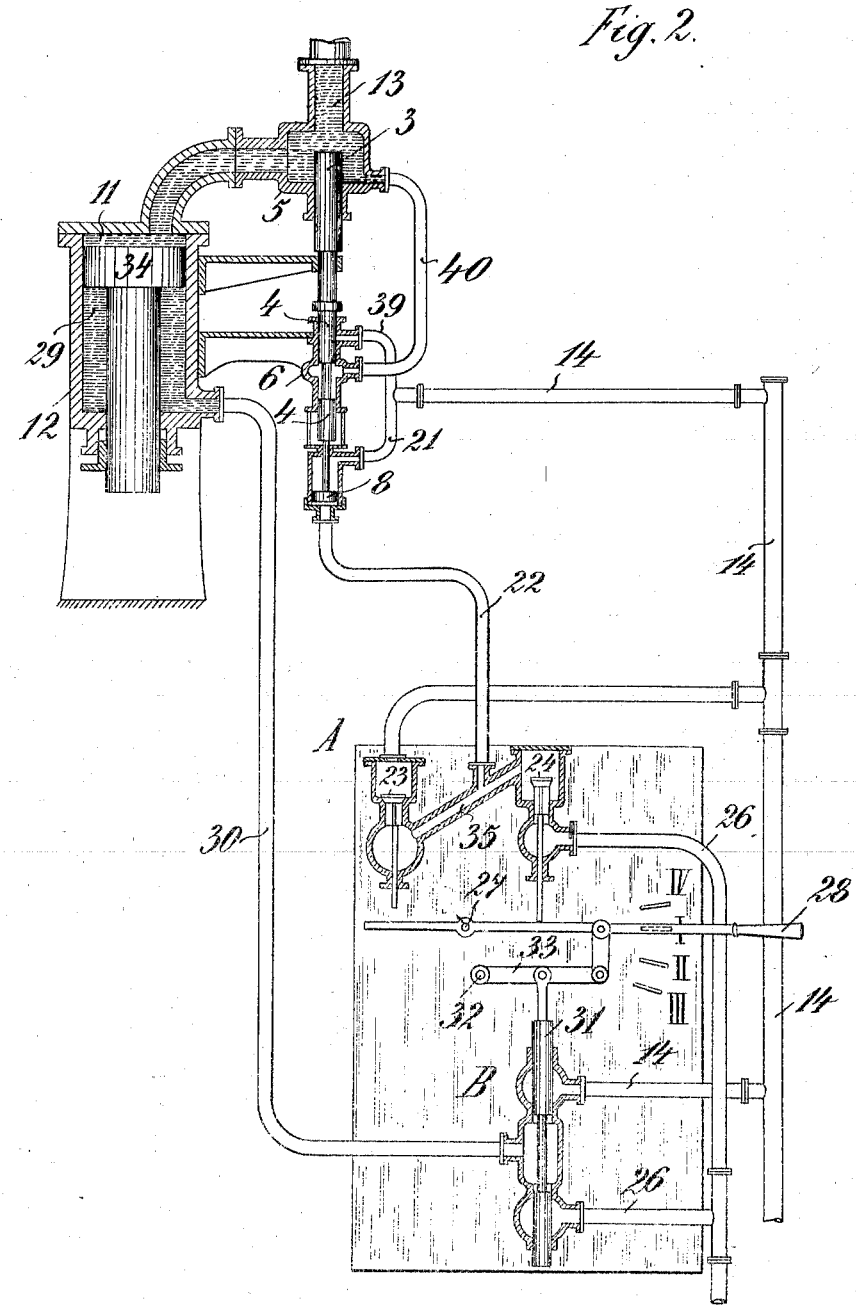

Patented July 5, 1904.

UNITED STATES PATENT OFFICE.

WILAND ASTFALCK, OF TEGEL, NEAR BERLIN, GERMANY.

MEANS FOR CONTROLLING HYDRAULIC APPARATUS.

SPECIFICATION forming part of Letters Patent No. 764,412, dated July 5, 1904.

Application filed December 5, 1903. Serial No. 183,938. (No model.)

*To all whom it may concern:*

Be it known that I, WILAND ASTFALCK, engineer, a subject of the German Emperor, residing at No. 92 Berlinerstrasse, Tegel, near Berlin, in the Kingdom of Prussia and German Empire, have invented certain new and useful Improvements in Means for Controlling Hydraulic Apparatus, of which the following is a specification.

This invention relates to improvements in that class of machines shown in my Patent No. 754,113 and application, Serial No. 112,550, in which means for controlling hydraulic presses, stamps, shears, and the like are shown.

The improvement consists in so arranging the controlling devices of the charging and high-pressure conduits in connection with a hydraulic operating device common to both in such a manner that after the said hydraulic device has been started the controlling device of the charging-conduit is closed before the controlling device of the high-pressure conduit has placed the latter in communication with the interior of the pressure-cylinder, whereas the controlling device of the high-pressure conduit is closed before the charging-conduit is opened. By this means the passage of water at high pressure to the charging device is prevented. The two controlling devices can be arranged side by side or one above the other. In the former case the hydraulic operating device can be provided with a locking device by which the closed controlling device is locked to prevent its premature opening.

In the annexed drawings, Figure 1 is a diagram on one form of the apparatus in which the controlling devices are side by side. Fig. 2 represents a form of the apparatus in which the said devices are arranged one above the other.

In the form of construction illustrated in Fig. 1 each of the controlling devices 3 and 4, which may consist of a valve, slide, or cock, is arranged in a box 5 or 6, and the said devices are connected to each other by a rocking lever 9, pivoted to the rod 7 of the hydraulic piston 8. The boxes 5 and 6 communicate with each other by means of a conduit 10. The box 5 communicates with the pressure-chamber 11 of the cylinder 12 and with the charging-conduit 13. The box 6 communicates with the high-pressure pipe 14. The locking device consists of a cam-path 15 and a slide 20, adapted to be moved in guides 16 and 17 by means of the said cam-path and connected to one or other of the rods 18 and 19 of the controlling devices. Instead of this arrangement the slide can be provided with the cam-path, and the upper end of the piston-rod can engage into said path. The hydraulic operating device 8 is connected by a pipe 21 to the high-pressure pipe 14 and by a pipe 22 with an auxiliary controlling device A, provided with a discharge-pipe 26 and connected by a pipe 25 to the high-pressure pipe 14. The controlling parts 23 and 24 of the said auxiliary controlling device A are adapted to be opened by means of a lever 28, pivoted at 27. The chamber 29 of the pressure-cylinder is connected by a pipe 30 to a special controlling device B in communication with the high-pressure pipe 14 and the discharge-pipe 26. The controlling part 31 of the device B is connected to the lever 28 by means of a system of levers 33, pivoted at 32. The action of this form of the apparatus is as follows: If the controlling-lever 26 is moved into the position II, the valve 24 is somewhat lowered without being closed. The controlling device 31, however, places the pipes 30 and 26 in communication with each other, so that water can flow from the chamber 29, the pressure-piston 34 can descend, and the pressure-chamber 11 can be charged with water. The high-pressure valve 4 is closed by the pressure bearing thereon and on the piston 8 of the hydraulic operating device. If the lever 28 is moved to the position III, the valve 24 is closed and the valve 23 opened and water from the high-pressure pipe 14 flows through the pipe 25, valve 23, pipe 35, and pipe 22 to the space below the piston 8 of the operating device, which it drives upward. Since, however, the pressure acting on the valve 4 causes the latter to offer greater resistance than the valve 3, the lever 9 rotates about the pivot 36 and the valve 3 is closed. When this has taken place, the said valve 3 offers the greater resistance, so that during the further ascent of the controlling-piston the lever 9 rotates about the pivot 37 and the valve 4 is opened, so that water from the pipe 14 flows through the pipe 10 to the chamber 11 and exerts pressure therein. When the lever 28 is moved back to the position I, the pipe 30 is shut off from the pipe 26. At the same time the valve 23 is closed and the valve 24 opened, so that pressure is removed from the under side of the controlling-piston 8, which thereupon descends, the water below it being discharged through the pipes 22 and 26. While this takes place the valve 4 is first operated and closed, since the valve 3 is held closed by the pressure of the water below it, and thereupon the said valve 3 is opened. If the controlling-lever is moved to the position IV, the pipe 30 is placed in communication with the high-pressure pipe 14 by means of the controlling device 31, so that water from the said high-pressure pipe can flow to the space below the pressure-piston 34 and lift the latter into the position shown in the drawings. The action of the locking device is as follows: When the controlling-piston 8 moves upward, the valve 3 is first operated and closed, as already stated. At the same time the cam-path 15 pushes the slide 20 to the left, so that the said slide is moved out of the aperture in the rod 19 of the valve 4 and into the aperture 38 in the rod 18 of the valve 3. When the controlling-piston 8 descends, the movement of the slides is reversed. Owing to this arrangement the valve to be opened cannot be opened until it has been unlocked and after the other valve has been closed. When the valve to be opened has been unlocked, the other valve, which has been closed, is locked.
In the form of construction shown in Fig. 2 the controlling devices 3 and 4 are directly connected to each other and to the piston of the hydraulic operating device. The said controlling devices are always moved simultaneously and in the same direction. In view of this fact the said devices can only consist of slides or cocks. The action of this form of the apparatus is substantially the same as that of the apparatus shown in Fig. 1. When the pressure-piston 34 has been moved downward by means of the controlling device B and the valve 24 has been closed and the valve 23 opened by moving the controlling-lever 28 into position III, water flows from the pipe 22 to the space below the controlling-piston 8 and causes the slides or pistons 4 and 3 to be moved upward. During the upward movement of said slides 3 and 4 the former shuts off the charging-pipe 13 before the latter has placed the pipes 39 and 40 in communication with each other. When the said pipes 39 and 40 have been placed in communication, so that water from the high-pressure pipe 14 can flow through them to the pressure-chamber 11, the pressing operation takes place. When the controlling-lever is moved back to the position I, the pipe 30 is shut off from the pipe 26. At the same time the valve 23 is closed and the valve 24 opened, so that pressure is removed from the under side of the controlling-piston 8 and the latter descends, with the slides 4 and 3. The charging-pipe 13 is not opened until the pipe 39 has been shut off from the pipe 40.

I declare that what I claim is—

1. In apparatus of the character described, the combination with a charging and high-pressure conduit, of two controlling devices adapted to control said charging and high-pressure conduits, means for connecting said controlling devices together, a hydraulic operating device common to both said controlling devices and adapted to actuate the latter, so that the controlling devices close the charging-conduit before the high-pressure conduit can be opened and vice versa, and means for locking said controlling devices alternately in their closed positions, substantially as described.

2. In apparatus of the character described, the combination with a charging and high-pressure conduit of two controlling devices adapted to control said charging and high-pressure conduits, a rocking lever for connecting said controlling devices together, a hydraulic operating device common to both said controlling devices and in connection with said rocking lever so that the controlling devices are actuated to close the charging-conduit before the high-pressure conduit can be opened and vice versa and means for locking said controlling devices alternately in their closed positions, substantially as described.

3. In apparatus of the character described, the combination with a charging and high-pressure conduit of two controlling devices, adapted to control said charging and high-pressure conduits, a rocking lever for connecting said controlling devices together, a hydraulic operating device common to both said controlling devices and in connection with said rocking lever so that the controlling devices are actuated to close the charging-conduit before the high-pressure conduit can be opened and vice versa, and means for locking said controlling devices alternately in their closed positions, consisting of a cam-path actuated by said operating device and a slide engaging said cam-path and adapted to lock one or other of said controlling devices, substantially as described.

4. In apparatus of the character described the combination with a charging and high-pressure conduit of two controlling devices adapted to control said charging and high-pressure conduits, a rocking lever for connecting said controlling devices together, a hydraulic operating device common to both said controlling devices and in connection with said rocking lever so that the controlling devices are actuated to close the charging-conduit before the high-pressure conduit can be opened and vice versa, means for locking said controlling devices alternately in their closed positions consisting of a cam-path actuated by said operating device and a slide engaging said cam-path and adapted to lock one or other of the controlling devices, and auxiliary controlling mechanism adapted to control the operating device aforesaid substantially as described.

The foregoing specification signed at Berlin this 20th day of November, 1903.

WILAND ASTFALCK.

In presence of—
 HENRY HASPER,
 WOLDEMAR HAUPT.